United States Patent [19]

Kinzenbaw

[11] Patent Number: 4,696,152
[45] Date of Patent: Sep. 29, 1987

[54] APPARATUS FOR LEVELING A COMBINE

[76] Inventor: Jon E. Kinzenbaw, R.R. 1, Box 184, Williamsburg, Iowa 52361

[21] Appl. No.: 778,532

[22] Filed: Sep. 20, 1985

[51] Int. Cl.⁴ .................... A01D 41/12; A01D 75/28
[52] U.S. Cl. .............................. 56/209; 130/27 AE; 280/6.11; 180/41
[58] Field of Search .............. 56/10.2, 209, 210, 211, 56/213, 214, 217, DIG. 10, DIG. 15; 130/27 AE, 27 R; 280/6 R, 6 H, 6.11, 6.1; 180/41, 300

[56] References Cited

U.S. PATENT DOCUMENTS

| | | | |
|---|---|---|---|
| 2,801,511 | 8/1957 | Vogelaar | 130/27 AE |
| 3,160,221 | 12/1964 | Boone | 280/6.11 |
| 3,309,097 | 3/1967 | Seeber | 280/6.11 |
| 4,126,322 | 11/1978 | Mika | 280/6.11 |
| 4,209,072 | 6/1980 | Orlandea et al. | 180/245 |
| 4,289,214 | 9/1981 | Spence | 180/234 |
| 4,484,765 | 11/1984 | Appelblatt et al. | 280/725 |
| 4,534,575 | 8/1985 | Grove et al. | 280/6.11 |

Primary Examiner—Robert Peshock
Assistant Examiner—John G. Weiss
Attorney, Agent, or Firm—Emrich & Dithmar

[57] ABSTRACT

Apparatus for leveling the front axle of an agricultural combine includes left and right wheel linkages in the form of four-bar linkages. A connecting rod synchronizes the motion of the four-bar linkages. Hydraulic cylinders are connected between the vehicle frame and the wheel linkages respectively to actuate the linkages such that as one wheel is raise above the axle the other wheel is lowered beneath the axle substantially the same amount as the first wheel is raised thereby maintaining the axle in a generally horizontal disposition.

9 Claims, 4 Drawing Figures

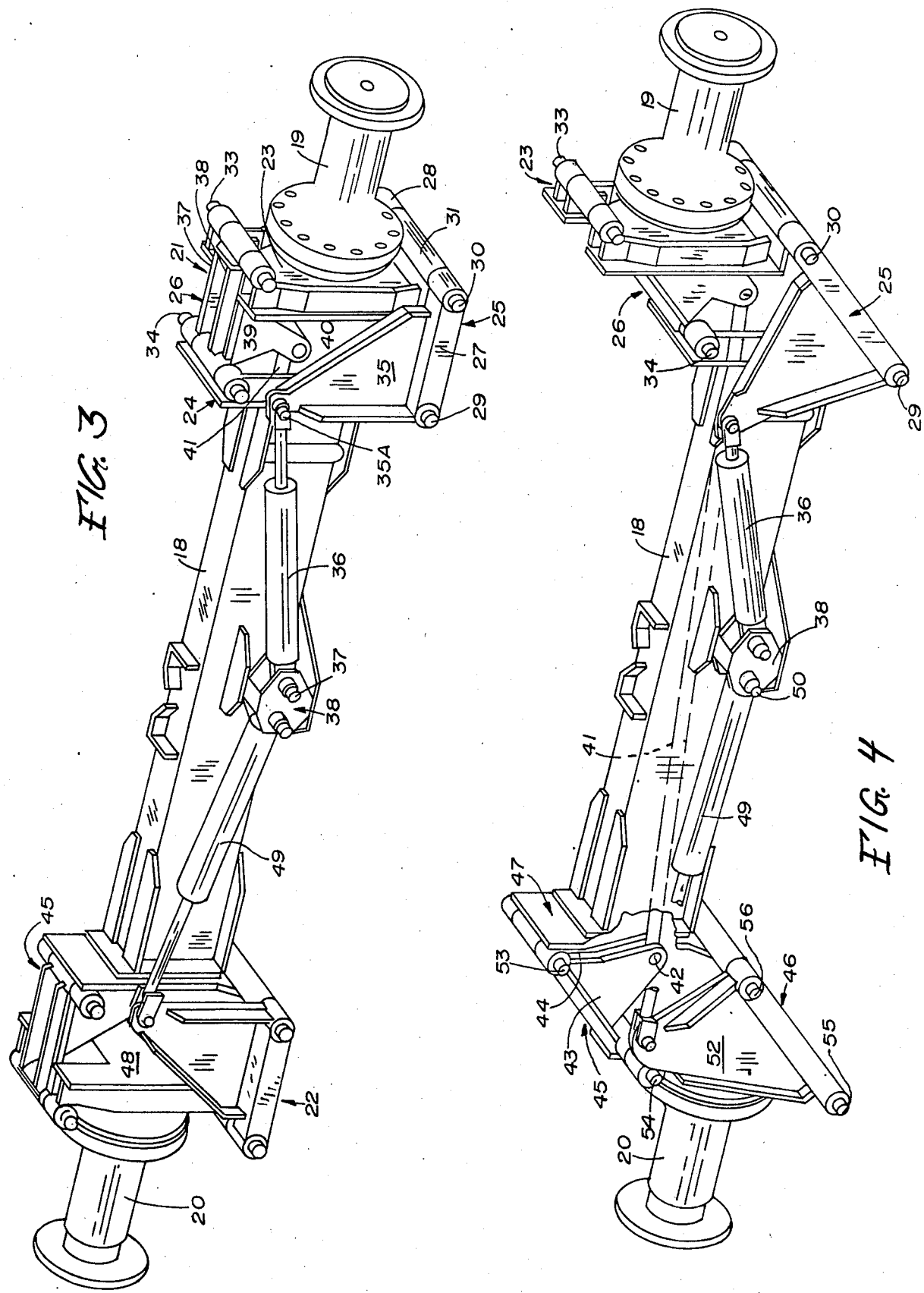

APPARATUS FOR LEVELING A COMBINE

BACKGROUND AND SUMMARY OF THE INVENTION

The present invention relates to an agricultural combine; and more particularly, it relates to apparatus for leveling the frame of a hillside combine as the harvester traverses an inclined or sloped area.

There are combines capable of traversing an inclined or sloped area while maintaining the combine frame level. The purpose of leveling a combine is that the internal mechanism for processing the crop and separating the seed stays in a level position at all times. This has the advantage that the various functioning parts of the combine, such as the cylinder, augers and cleaning shoe are level at all times and the distribution of grain in those devices is uniform. This has the effect of making the functioning parts of the combine operate more efficiently and more accurately.

One such prior system uses a walking beam axle in the front and rear of the combine and independent spring suspension at each wheel in order to operate properly. In some cases, the walking beam axle may be replaced by vertically oriented hydraulic cylinders arranged so that as one cylinder extends to raise one side of the combine relative to the axle, the complementary cylinder retracts to lower the other side of the combine.

The present invention employs hydraulic cylinders for leveling the combine frame. The invention may be operated manually by the operator or it may be under control of a level-sensing mechanism. It also has the advantage that it may be adapted to retrofit existing combines which are not hillside combines but have a hollow front axle.

The present invention uses left and right side wheel linkages interposed between the front left and right wheels of the combine. Preferably, the wheel linkages are four-bar linkages so that if the front axle is horizontal, the wheels remain vertical for all adjusted positions. The rear axle may be connected to the main frame by a pivot connection at the mid-point of each so that if the front axle is horizontal, the entire frame will likewise be horizontal.

First and second hydraulic cylinders are connected between the mid-point of the front axle and the respective wheel linkages. These cylinders may be controlled either from the operator's position by the operator or by a level-sensing switch automatically if desired, as will be better understood from the detailed description given below.

The illustrated wheel linkages are four-bar linkages with two vertical and two horizontal links. One of the horizontal links is in the form of a crank, and that link is connected to the rod end of an associated hydraulic cylinder. The other horizontal link of the wheel linkage, sometimes referred to as a "control" link, is pivotally connected to the corresponding control link of the wheel linkage for the other wheel by means of a connecting rod or tie rod. In the case of retrofitting at least one manufacturer's combine from a level-land combine to a hillside combine, the tie rod interconnecting the control links of the wheel linkages may extend through the horizontal front axle of the combine. This reduces the expense of such a modification.

In operation, as one hydraulic cylinder is retracted, it cranks its associated wheel linkage to lift the tire which that linkage supports. The other hydraulic cylinder extends to crank its associated wheel linkage in a counter direction, thereby lowering its associated wheel. When two hydraulic cylinders are used, the tie rod between the control links on the wheel linkages acts as a synchronizing mechanism so that the upward displacement of the first wheel relative to the axis of the axle is substantially equal to the downward displacement of the other wheel. If only one hydraulic cylinder is used, the tie rod may be used to actuate the corresponding control link on the other side of the axle, also serving to insure that the amount by which one wheel is raised is substantially equal to the amount by which the other wheel is lowered, thereby maintaining the front axle in a generally horizontal disposition.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 3 is an upper perspective view of an axle assembly incorporating the present invention, taken from the left side; and FIG. 4 is a view similar to FIG. 3, partially broken away to show certain elements, and with the mechanism actuated for traversing a slope.

DETAILED DESCRIPTION OF THE ILLUSTRATED EMBODIMENT

Figure 1:
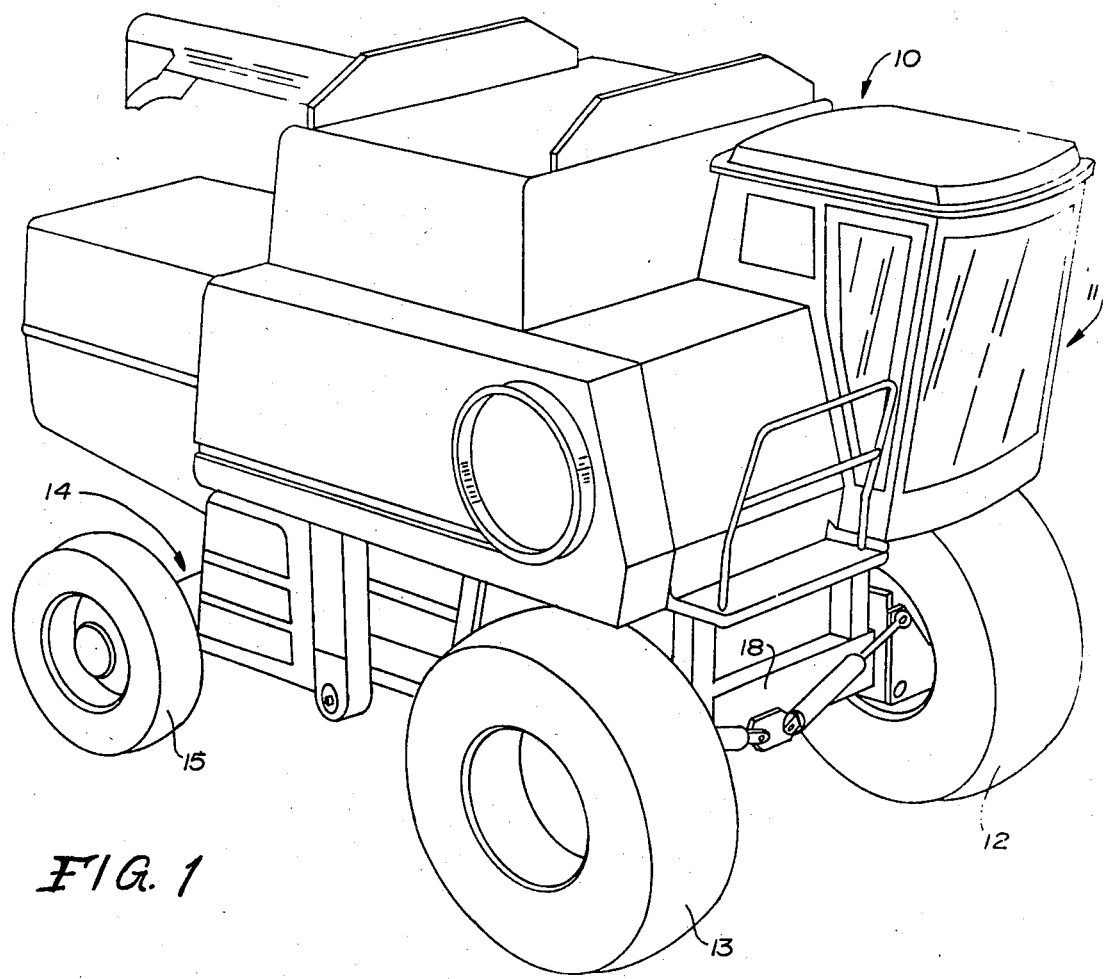
FIG. 1 is an upper front perspective view, taken from the right side, of an agricultural combine incorporating the present invention, but with the a header assembly removed so as to better show the invention.

Referring first to FIG. 1, there is shown a combine generally designated by reference numeral 10. The combine 10 shown in FIG. 1 has had the header assembly removed for clarity. For purposes of orientation, the operator's cab is genreally designated 11, the left and right front wheels are designated 12 and 13 respectively, and a rear axle assembly is generally designated 14 which includes a right rear tire 15 seen in FIG. 1. The remaining portions of the combine are conventional and need not be described in further detail.

The combine that has been illustrated is shown for exemplary purposes only, and is not to be taken as limiting the invention in any way. For example, the illustrated embodiment shows single front tires, but they obviously could be dual wheels. Further, the illustrated embodiment is shown in a retrofitted combine made by a large manufacturer and which has a hollow front axle. Manufacturers of original equipment may find it desirable to maintain a solid axle and arrange the leveling system of this invention to exist entirely outside the front axle, or they may desire to eliminate the connecting rod entirely and substitute another device to synchronize the movement of the wheel linkages, as will be described.

The drive and transmission systems on the combine may also be conventional and need not be described. Each of the front wheels 12, 13 may be driven by means of a front drive system which includes a differential mounted to the combine frame and driven by the prime mover. The differential typically includes left and right drive shafts driving respectively left and right final drives located at and connected respectively to the front wheels 12, 13. Each of the final drives is a conventional gear train driven by the prime mover through the differential mentioned above.

Figure 2:
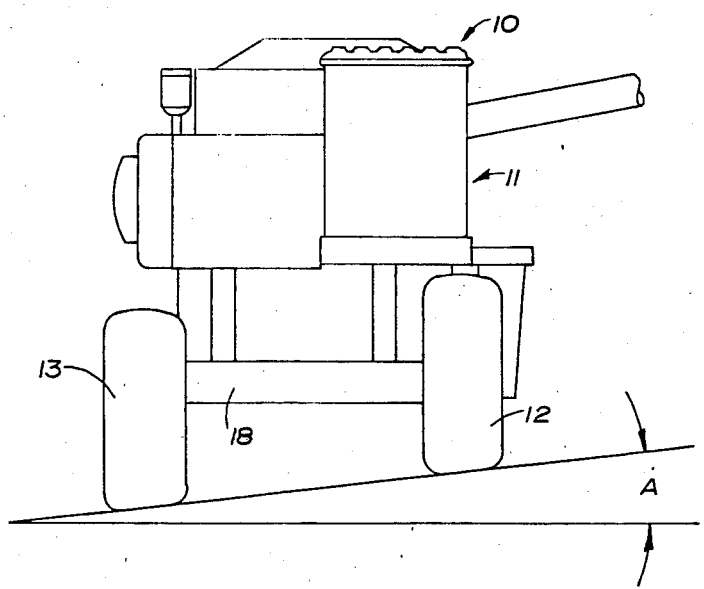
FIG. 2 is a diagrammatic illustration of a combine traversing an inclined or sloped area.

In the case of a hillside combine wherein the combine is designed to traverse a slope as illustrated in FIG. 2, the output drive shafts of the differential are connected to the final drive assemblies for the front wheels 12, 13 by means of telescoping shafts which include universal joints to accomodate the vertical movement of the left and right wheels.

As seen in FIG. 2, it is desirable that the front axis 18 of the combine remain horizontal when a hill is being traversed (the slope of the hill being illustrated diagrammatically in FIG. 2 by the angle A), and that the amount by which the center of the left front wheel raises above the axis of the axle 18 be substantially equal to the amount by which the center of the complementary right front wheel 13 extends below that axis. The front axle 18 of the combine is an integral part of the frame of the combine, as is conventional.

Turning now to FIG. 3, the front axle 18 is in the form of a rectangular tubular beam, with the left side of the axle at the right side of the drawing because "left" and "right" are viewed, according to convention, from the standpoint of an operator in the cab. Thus, the left wheel final drive is designated 19, and the right wheel final drive is designated 20. The wheel rims and tires are removed for clarity, but it will be understood that they are mounted to the hubs driven by the final drive assemblies shown.

The left and right final drive assemblies 19, 20 are mounted to the left and right sides respectively of the front axle 18 by means of left and right wheel linkage assemblies generally designated 21 and 22, respectively.

The left and right wheel linkage assemblies 21, 22 have corresponding, but complementary parts, forming mirror images of one another. Therefore, it is necessary only to describe one of the linkage assemblies in detail for a complete understanding of the invention, but reference will be made to the complementary parts when necessary for completeness or clarity.

Turning then to the left wheel linkage assembly 21, it is a four-bar linkage or parallel linkage, including a first generally vertical link 23 (to which the wheel hub 19 is mounted), a second vertical link generally designated 24 rigidly mounted to the outboard left end of the axle 18, a lower horizontal link generally designated 25 and an upper horizontal link generally designated 26. Link 26 is sometimes called a "control" link for reasons which will become clear.

Because of the weight of the combine, especially when fully loaded, and the necessity of the wheel linkages to carry heavy loads, each of the links must be strong enough to maintain its rigidity under load and during operation. Thus, all of the individual links are strengthened by braces, supports and/or plates of double thickness as needed, taking into account the loaded weight of a combine which is considerable and the rugged conditions of use of a combine. These details are, however, unnecessary for a complete understanding of the invention by one skilled in this art, so they need not be described.

In addition, the particular structure of the individual links is not critical to the practice of the invention. By way of example, the lower horizontal link 25 comprises two link bars 27, 28 in the ends of which are journaled pivot pins 29, 30. The vertical link 23 includes a sleeve 31 which receives the pin 30 so that the links 23, 25 are pivotally connected by the pin 30. Similarly, the links 25 and 24 are pivotally connected by the pin 29. The upper part of link 23 is similarly pivotally connected by a pin 33 to the upper horizontal link 26; and the links 24 26 are pivotally connected by means of a pin 34.

The individual link 27 of the lower horizontal linkage 25 is provided with an upwardly extending plate 35 which is stiffened by means of flanges as seen. Thus, the combination of the link 27 and plate 35 forms a crank for rotating the lower linkage 25 about pin 29, the purpose of which will be understood from the following description. The upper portion of the plate 35 is pivotally connected at 35A to the rod of a first hydraulic cylinder 36, the butt end of which is connected by means of a pin 37 to a center mounting bracket 38 which is welded to the center of the axle 18. As the cylinder 36 retracts, the link 25 pivots counterclockwise about pin 29 to the position shown in FIG. 4, as will be described in further detail below.

The upper horizontal or control link 26 is formed of two parallel plates 37, 38 which extend downwardly in the form of a dog leg, as illustrated at 39 to form a trunnion mount for a pivot pin 40 which is journalled in the left side of a connecting rod 41. The rod 41 extends through the tubular front axle and has its right end pivotally connected to a pin 42 mounted between plates 43, 44 of the complementary control link 45 of the right wheel linkage assembly 22. The lower horizontal link of the right wheel linkage is generally designated 46, the inner vertical link is generally designated 47, amd the outer vertical link is designated 48 (see FIG. 3).

A second hydraulic cylinder generally designated 49 has its butt end is connected by means of a pin 50 to the mounting bracket 38;and its rod end is pivotally connected to a plate 52 which is a part of the lower horizontal link 25. For purposes of reference, the pivot pins of the right wheel linkage are designated respectively 53, 54, 55 and 56.

The hydraulic cylinders 36, 49 are double-acting cylinders actuated by a control located in the operator's cab. The rod end of one cylinder is connected in hydraulic circuit with the butt end of the other, and the butt end of the first cylinder is connected hydraulically with the rod end of the second cylinder so that as one cylinder is extended, the other is retracted. It is not necessary that both cylinders be used. However, the use of two cylinders does reduce the size of the cylinders. When two cylinders are used, the one which is extending does more work.

Further, the operation of the cylinders 36, 49 (or one cylinder if both are not used) may be automatically actuated by a level-sensing switch. Such switches are used in leveling headers automatically. Header leveling systems are independent of the combine frames normally.

In operation, when the hill slopes upwardly to the left of the operator, assuming the case where the system is under the control of the operator, when he actuates the control lever to raise the left side of the combine, hydraulic fluid under pressure is pumped into the rod end of cylinder 36 to cause it to contract, and into the butt end of the cylinder 49 to cause it to extend. The cylinders will extend at equal rates because the tie rod 41 rigidly interconnects the left and right wheel linkages and causes them to be synchronized and to move in equal vertical increments.

As the cylinder 36 retracts, the lower horizontal link 25 and the plate 35, which form a crank arm as indicated, rotate counterclockwise about pin 29 (when viewed from the front). That is to say, the lower link 25 moves from the position of FIG. 3 to the position shown in FIG. 4 wherein the first vertical link 23 to which the left wheel hub 19 is mounted is raised above the front axle 18. Specifically, the links 25, 23 rotate relative to one another from a right angle as seen in FIG. 3 to a generally obtuse angle as seen if FIG. 4, and the axis of wheel spindle 19 is raised above the axis of the front axle 18, yet maintained in a horizontal disposition parallel to the axis of the axle.

As the lower link 25 rotates counterclockwise about the pin 29, the upper control link 26 similarly rotates counterclockwise about the pin 34, causing the connecting rod 41 to move to the left (to the right as seen in FIG. 4), and similarly rotating the upper link 45 of the right wheel linkage in a counterclockwise direction about the pin 53. As the control link 45 on the right wheel linkage rotates downwardly from the position shown in FIG. 3 to that shown in FIG. 4, the right wheel of 20 moves down relative to the axle 18, maintaining the axis of rotation of the wheel hub substantially parallel to the axis of the axle 18. The amount by which the axis of the right wheel is displaced beneath the axis of the axle is substantially equal to the displacement of the axis of the left wheel hub 19 above the axis of the axle 18. Because of the geometry of the linkages and cylinder mounts and placement the downward displacement of the right wheel is not precisely equal to the upward displacement of the left wheel, but because the two linkages are mirror images of one another and connected together by means of the connecting rod 41, these displacements are substantially equal in the sense of maintaining the axle generally horizontal.

In actuality, most of the work is being done by the hydraulic cylinder 49 in the example given because pressurized fluid is forced into the butt end of hydraulic cylinder 49 when accomodating the combine to a slope which rises to the left of the operator, whereas fluid at the same pressure is being routed in to the rod end of the cylinder 36, and the working surface of the butt end of the cylinders is larger than the rod end. Persons skilled in the art will appreciate that only one cylinder need by employed to power both linkages since that cylinder can be extended or retracted under power as any normal double-acting cylinder. The rear end of the combine will accomodate to the slope for which the front end is set because the rear axle may simply be a pivot axle—that is, it may be connected at its mid-point by a pivot connection to the rear end of the frame of the combine. Further, as already mentioned, whereas in the illustrated embodiment the cylinders 36, 49 are actuated manually by the operator, persons skilled in the art would be able to incorporate a level-sensing switch to operate these cylinders as the switch sensed variation from a true vertical position (representing a true horizontal position for the front axle).

In addition to the illustrated embodiment and the modifications described above, the connecting rod 41 could be eliminated and the wheel linkages synchronized by using a master/slave cylinder arrangement for the hydraulic cylinders 36, 49 with the master and slave cylinders sized for equal displacement. However, the use of the tie rod 41 has the advantage that should a cylinder rod break, the combine front end will not "fall". As another alternative, flow diverters could be used to meter precisely the volumes of fluid to the cylinders 36, 49 so that their respective displacements are equal in both cycles of operation (i.e., raising the left side of the combine or raising the right side). Another alternative would be to replace the two cylinders shown with a single cylinder having the rod extending out both ends and a single, double-acting piston. This would require some additioal linkage or re-arrangement to permit alignment of both ends of the rod with the respective wheel linkages.

Having thus disclosed in detail one embodiment of the invention and suggested modifications thereof, persons skilled in the art will be able to substitute equivalent elements for those disclosed and to modify the structure illustrated while continuing to practice the principle of the invention; and it is, therefore, intended that all such modifications and substitutions be covered as they are embraced within the spirit and scope of the appended claims.

I claim:

1. In an agricultural implement having a frame with an axle, apparatus for maintaining said axle in a generally horizontal disposition, comprising: first and second support wheel means for the left and right side of said axle respectively; first and second wheel linkage means for mounting said first and second support wheel means respectively to the left and right sides of said axle and for maintaining the respective axes of rotation of said wheel means generally parallel to the axis of said axle, said first and second wheel linkage means each comprising a four-bar linkage; synchronizing means for synchronizing the movement of said first and second wheel linkages means such that vertical movement of one of said support wheel means relative to said axle will cause the other wheel linkage means to move its associated support wheel means relative to said axle substantially the same distance as, but in an opposite vertical direction to the movement of said first support wheel means; and power means connected between said frame and at least one of said wheel linkage means for actuating the same and causing the associated support wheel means to move in a vertical direction relative to said axle for causing said associated wheel means to move vertically relative to said axle.

2. The apparatus of claim 1 wherein said synchronizing means comprises a connecting link pivotally connected at its ends respectively to corresponding links of said first and second wheel linkage means whereby said connecting link translates the vertical movement of said one support wheel means to a corresponding vertical movement of said other support wheel means but in an opposite vertical direction.

3. The apparatus of claim 1 wherein each of said linkage means comprises a four-bar linkage including a first vertical link mounted to the associated outboard end of said axle; a second vertical link mounted to the associated wheel means; an upper horizontal link pivotally connected at one end to the upper portion of said first vertical link and at the other end to the upper portion of said second vertical link; and a lower horizontal link pivotally connected at one end to the lower portion of said first vertical link and pivotally connected at the other end to the lower portion of said vertical link.

4. The apparatus of claim 3 wherein said power means comprises at least one hydraulic cylinder pivotally connected at one end to said axle and pivotally connected at the other end to one of said horizontal links of one of said wheel linkage means by means of a plate forming a crank therewith.

5. The apparatus of claim 4 wherein said power means further comprises a second hydraulic cylinder connected at one end to said axle and at the other end to the corresponding horizontal linkage of said other four-bar linkage by means of a member forming a crank therewith, whereby as one of said hydraulic cylinders extends, the other retracts.

6. The apparatus of claim 3 wherein said connecting means includes a tie rod interconnected between the horizontal linkages of said respective wheel linkage means to which said hydraulic cylinders are not connected.

7. The apparatus of claim 3 wherein each of said horizontal links includes an extension forming a crank arm, said connecting link being pivotally connected at its ends to the crank arms of said upper horizontal links respectively of said first and second linkage means; said power means comprising first and second hydraulic cylinders each connected pivotally at respective one ends to the center of said axle and connected pivotally at their respective other ends to the crank arms of said lower horizontal links respectively.

8. The apparatus of claim 7 characterized in that the butt end of one hydraulic cylinder is connected in hydraulic circuit with the rod end of the other, and the rod end of said one hydraulic cylinder is connected in hydraulic circuit with the butt end of said other hydraulic cylinder.

9. The apparatus of claim 8 wherein said axle is hollow and said synchronizing means comprises a connecting link extending through said axle and interconnecting corresponding links of said first and said second wheel linkage means.

* * * * *